US007780527B2

(12) United States Patent
Gauselmann

(10) Patent No.: US 7,780,527 B2
(45) Date of Patent: Aug. 24, 2010

(54) GAMING MACHINE HAVING THREE-DIMENSIONAL TOUCH SCREEN FOR PLAYER INPUT

(75) Inventor: Michael Gauselmann, Espelkamp (DE)

(73) Assignee: Atronic International GmbH, Lübbecke (DE)

(*) Notice: Subject to any disclaimer, the term of this patent is extended or adjusted under 35 U.S.C. 154(b) by 2077 days.

(21) Appl. No.: 10/390,318

(22) Filed: Mar. 14, 2003

(65) Prior Publication Data

US 2003/0216174 A1 Nov. 20, 2003

Related U.S. Application Data

(63) Continuation-in-part of application No. 10/146,565, filed on May 14, 2002, and a continuation-in-part of application No. 10/354,557, filed on Jan. 29, 2003.

(51) Int. Cl.
*A63F 13/00* (2006.01)

(52) U.S. Cl. ............................ 463/30; 463/32; 463/37; 463/46; 463/47

(58) Field of Classification Search .............. 379/93.19, 379/93.17, 93; 463/30-37, 46-47; 345/173
See application file for complete search history.

(56) References Cited

U.S. PATENT DOCUMENTS

| | | | | |
|---|---|---|---|---|
| 5,342,047 | A * | 8/1994 | Heidel et al. | 463/29 |
| 5,823,874 | A | 10/1998 | Adams | 463/17 |
| 5,848,932 | A | 12/1998 | Adams | 463/20 |
| 5,882,261 | A | 3/1999 | Adams | 463/20 |
| 5,951,397 | A * | 9/1999 | Dickinson | 463/36 |
| 5,997,401 | A | 12/1999 | Crawford | 463/20 |
| 6,105,962 | A | 8/2000 | Malavazos et al. | 273/143 R |
| 6,168,520 | B1 | 1/2001 | Baerlocher et al. | 463/16 |
| 6,186,894 | B1 | 2/2001 | Mayeroff | 463/20 |
| 6,201,532 | B1 * | 3/2001 | Tode et al. | 345/156 |
| 6,210,279 | B1 * | 4/2001 | Dickinson | 463/37 |
| 6,454,649 | B1 * | 9/2002 | Mattice et al. | 463/17 |
| 2003/0064800 | A1 * | 4/2003 | Jackson et al. | 463/30 |
| 2004/0166930 | A1 * | 8/2004 | Beaulieu et al. | 463/25 |
| 2005/0030292 | A1 * | 2/2005 | Diederiks | 345/173 |

OTHER PUBLICATIONS

"Let's Make A Deal", A Television Show, Mar. 14, 2003.
Barcrest "Bag Full of Dollars" brochure, 2 pages, Mar. 14, 2003.

* cited by examiner

*Primary Examiner*—James S. McClellan
*Assistant Examiner*—Sunit Pandya
(74) *Attorney, Agent, or Firm*—Patent Law Group LLP; Brian D. Ogonowsky

(57) ABSTRACT

In one embodiment, a gaming machine includes a separate touch screen located in an area where buttons are typically located. The touch screen virtual buttons may be both configurable by the player and configurable by the gaming machine. In one embodiment, the touch screen is 3-dimensional in that areas for being touched by the player are raised to give the impression of a physical button. Each raised portion may give tactile feedback to the player when pressed.

22 Claims, 6 Drawing Sheets

GAMING MACHINE HAVING THREE-DIMENSIONAL TOUCH SCREEN FOR PLAYER INPUT

CROSS-REFERENCE TO RELATED APPLICATIONS

This application is a continuation-in-part of U.S. application Ser. No. 10/146,565, filed May 14, 2002, and a continuation-in-part of U.S. application Ser. No. 10/354,557, filed Jan. 29, 2003.

FIELD OF INVENTION

This invention relates to gaming machines and, in particular, to player control devices in gaming machines.

BACKGROUND

A typical gaming machine found in casinos uses physical buttons to receive player inputs, such as to spin reels, bet, and cash out. Some video gaming machines use a touch screen as the main video screen to allow the player to make selections by touching virtual buttons (or other icons) on the touch screen.

SUMMARY

In one embodiment, a gaming machine includes a main display and a separate touch screen located in an area where buttons are typically located. The touch screen has virtual buttons that may be both configurable by the player and configurable by the gaming machine. For example, the player can locate the virtual buttons on the right or left side of the touch screen, change the size of the virtual buttons, delete virtual buttons not being used, select a language identifying the buttons, or select sounds when touching the buttons. The machine's computer can change the display on the touch screen to display the acceptable denominations of the machine or select a different set of virtual buttons depending on the game being played. Many more options are available. Many options can be provided to the player on the touch screen, as compared to physical buttons, since all options do not have to be present at all times.

In one embodiment, the touch screen is 3-dimensional in that areas for being touched by the player are raised to give the impression of a physical button. Each raised portion may give tactile feedback to the player when pressed. Therefore, the advantages of the touch screen control panel are achieved while the player retains the familiar feel of push buttons.

In one embodiment, a joystick is provided on the gaming machine to enable the player to perform game control functions that would normally be difficult using conventional gaming machine controllers.

In one embodiment, the player is given extra credits by the gaming machine if large denomination currency is inserted into the gaming machine. This typically results in longer playing times.

BRIEF DESCRIPTION OF THE DRAWINGS

The below described drawings are presented to illustrate some possible examples of the invention.

DETAILED DESCRIPTION

Although the invention can be implemented by modifying most types of modem gaming machines, one particular gaming machine platform will be described in detail.

Figure 1:
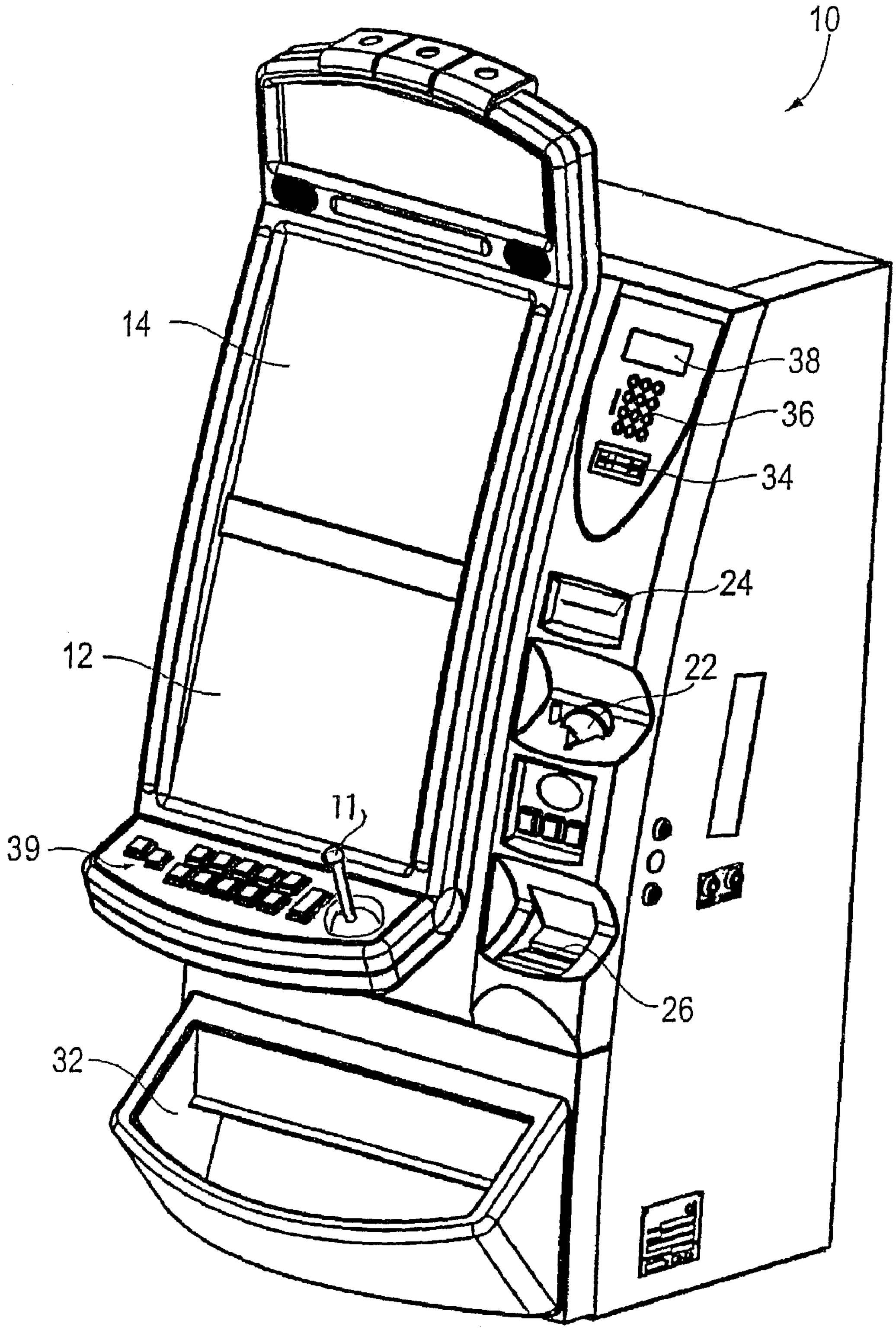
FIG. 1 is a perspective view of one example of a gaming machine incorporating a joystick.

FIG. 1 is a perspective view of a gaming machine 10 that incorporates a joystick 11 in accordance with one embodiment of the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide static information, such as an advertisement for the game, the rules of the game, pay tables, paylines, or other information, or may even display the game itself along with display 12. Alternatively, the area for display 14 may be a display glass for conveying information about the game.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 39 include any buttons needed for the play of the particular game or games offered by machine 10 including, for example, a bet button, a repeat bet button, a play two-ways button, a spin reels button, a deal button, hold cards buttons, a draw button, a maximum bet button, a cash-out button, a display paylines button, a display payout tables button, select icon buttons, and any other suitable button. In other embodiments (described later), buttons 39 are replaced by a touch screen with virtual buttons.

The game played may be a spinning reel type game, either using physical reels or simulated reels on a video screen, or the game may be a card game, such as poker. Any other game may be played.

Joystick 11 may be used to control a cursor or other object displayed on display 12 or 14. A cursor may be used to select an icon or other option displayed. In certain games, such as a maze type game, joystick 11 may be used to control the direction of a character or other object through the maze. Such a game may be a bonus game played after a certain outcome of a main game, such as after a certain symbol combination in the main game. Joystick 11 and software for converting the joystick 11 movement to usable signals for the gaming machine's CPU may be conventional.

Buttons 39 may be deleted and joystick 11 may be used for all player inputs. In one embodiment, joystick 11 has a select button at its tip. The select button may be the round knob at the end of joystick 11 in FIG. 1. The button is pressed to make a player selection. In another embodiment, pushing down on joystick 11 controls a switch to make the player selection.

Joystick 11 may be centrally located so as not to favor left-handed or right-handed players. The joystick may take different forms, such as a wider form to enable the player to use her palm to move the joystick.

Joystick 11 may also be replaced with a trackball to achieve similar results.

Figure 2:
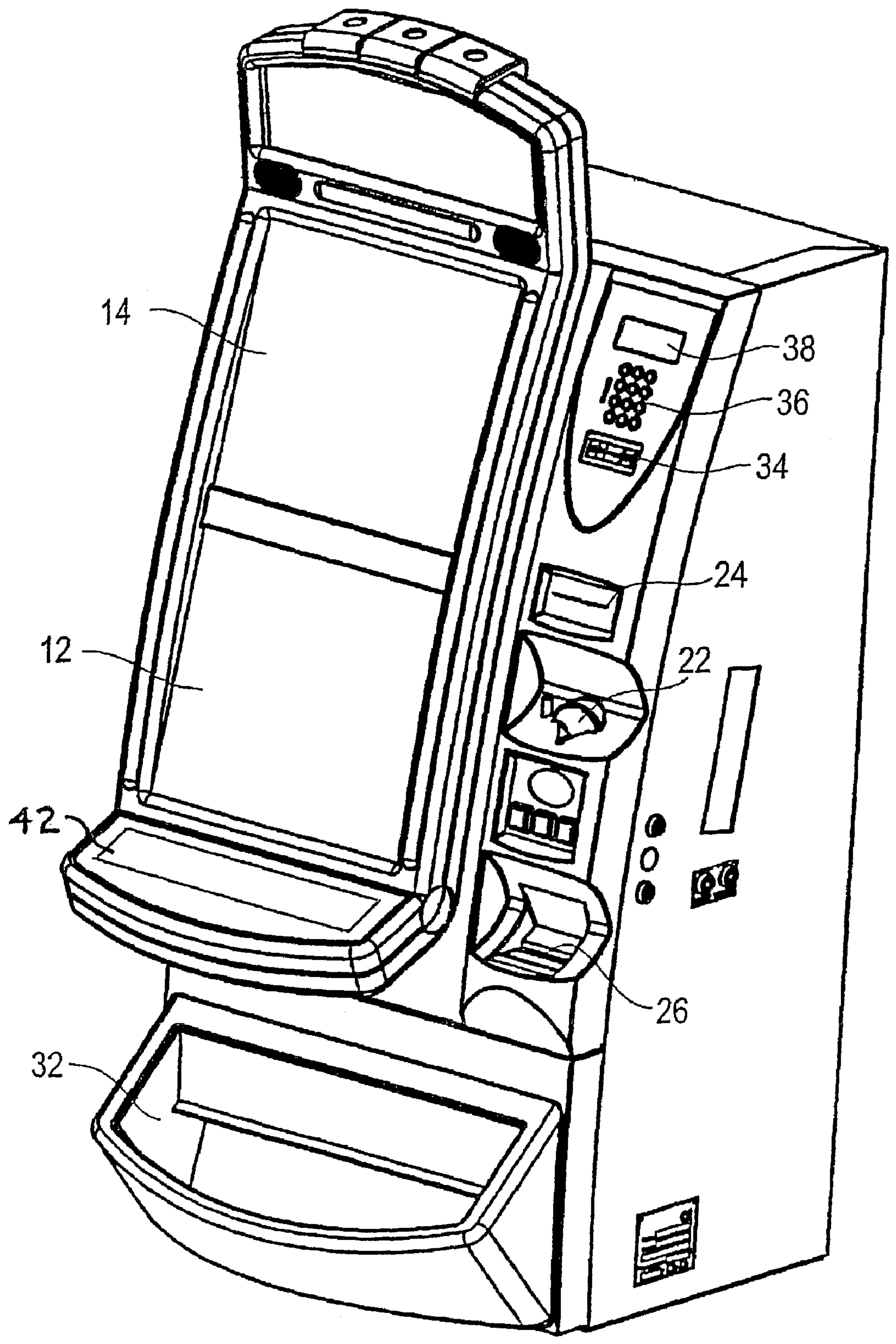
FIG. 2 is a perspective view of one example of a gaming machine incorporating a separate touch screen for player inputs.

FIG. 2 illustrates the gaming machine of FIG. 1 but with buttons 39 replaced by a touch screen 42. Touch screen 42 may be a conventional type, such as a touch-sensitive overlay on a TFT, LCD, CRT, or other display device. The overlay may detect a change in capacitance at X-Y coordinates by the player touching a position on the touch screen. Conventional circuits detect the touched X-Y position and associate the position with a function to be carried out. Any appropriate virtual buttons for player input may be displayed on touch screen 42, where actuation of any virtual button is by touching the virtual button. Touch screen 42 is conveniently located on an angled shelf and does not take up any of the main display 12 screen area. Accordingly, the game's display program is not affected by changes to the touch screen 42 display, and the entire main display 12 may be used for the game. Providing a touch screen 42 for player input provides many advantages, some of which are described below.

Conventional gaming machines that display virtual buttons on the vertical main display require the player to tilt her hand upward to touch the screen with the pad of her fingertip. This is especially inconvenient if the player has long fingernails. By providing the virtual buttons on an angled shelf, the player can simply rest her hands on the shelf while touching the virtual buttons.

Joystick 11 of FIG. 1 can be used in combination with touch screen 42. Any combination of joystick 11, buttons 39, and touch screen 42 can be used in the gaming machine.

Figure 3:
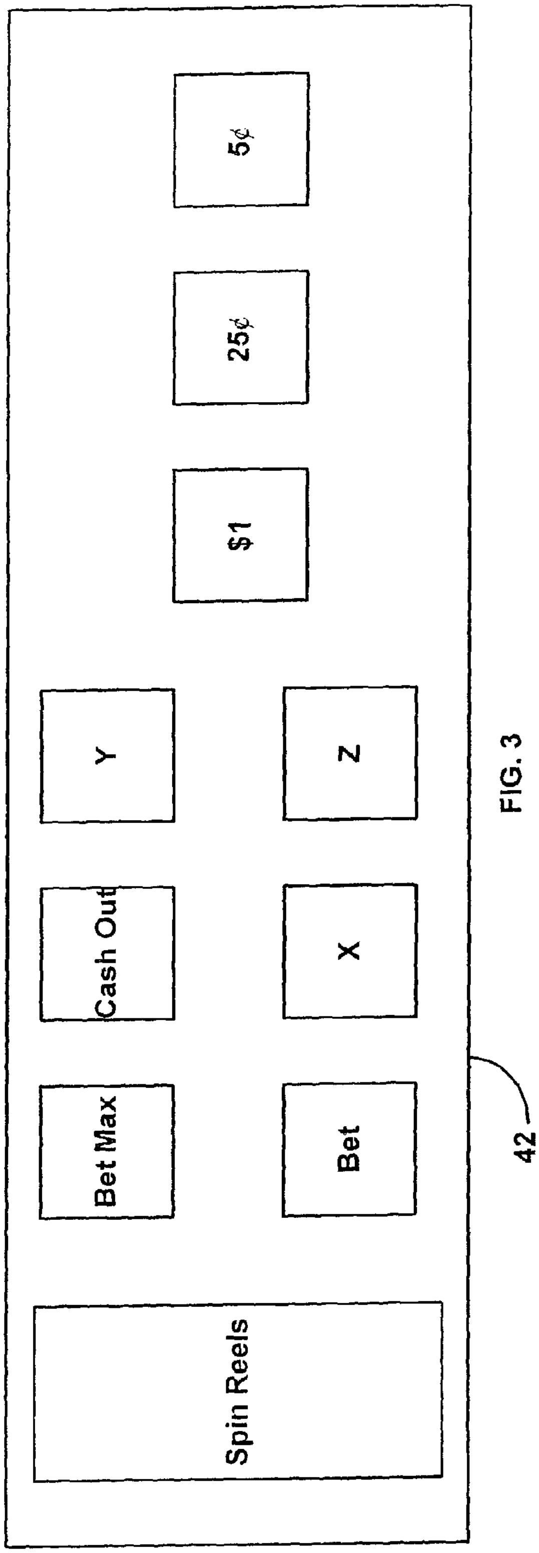
FIGS. 3, 4, 5, and 6 illustrate touch screen displays showing the flexibility of using a touch screen for player inputs.

FIG. 3 illustrates a possible display on touch screen 42. The display is for a conventional spinning reels type game, either on a video screen or using motor-driven reels. The basic virtual buttons include spin reels, bet max, bet one, and cash-out. Other buttons that may be used are generally designated X, Y, and Z. The player may touch any of the virtual buttons to perform its function. Also included are denomination virtual buttons for $1, 25¢, and 5¢. The player may touch a denomination button to select the value of a single credit. This affects the amount bet and the amount won during each game. To encourage players to select a high denomination credit value, the machine's processing circuitry may give the player extra credits (greater than the monetary value inserted into the machine) for selecting a high denomination credit value. In one embodiment, generating such extra credits are contingent upon the player inserting a high value bill into the machine.

In one embodiment, the player is given extra credits by inserting high value currency into the machine. Such a "discount" may be advertised on the display monitor, the display glass, or touch screen 42 to encourage players to insert high value currency. Examples of discounts may be 6% extra credits for inserting $100, 5% extra credits for inserting $20, etc. To prevent players from immediately cashing out of the machine, the discount may only apply if the player eventually wagers all of the credits on the game (e.g., for a $1 machine, the player must ultimately wager the 106 credits from the $100 bill in order to get the 6 extra credits). Other techniques may also be used to prevent the player from prematurely cashing out.

Some advantages of touch screen 42 include:

Player can select the language identifying the buttons and the language for any displayed messages;

Player can select which buttons to be displayed;

Player can select the location of the individual buttons for ease of touching;

Player can select the color, size, and shape of the buttons;

Machine can display only those buttons that are immediately of use to the player, thus simplifying the display;

Machine can highlight buttons (e.g., make brighter) that are appropriate to touch;

Machine may change the buttons for different games to be played;

Machine may present advertising or other messages on touch screen 42 (in the language selected by the player), such as how to use touch screen 42 to control the various button options;

Machine may display an elaborate player controller when appropriate, such as arrows for controlling a character through a maze.

Figure 4:
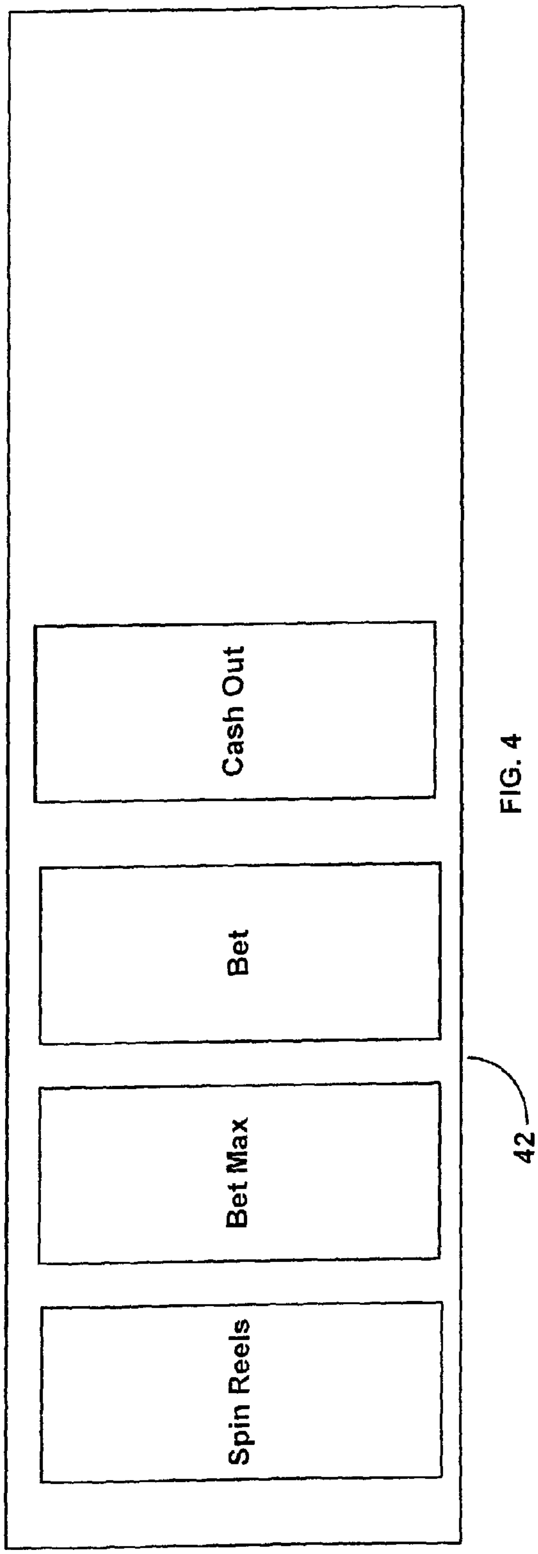

FIG. 4 illustrates another display on touch screen 42. The player may initially be presented with a default screen and be asked to choose certain options by touching an icon associated with the desired option. One option may be to only display essential virtual buttons, such as spin reels, bet max, bet one, and cash out. Messages or an advertisement may be displayed in the unused area. Using a menu driven display, the above-described options may be simply presented to the player for selection. The button-set options for touch screen 42 may be presented on touch screen 42 or on the main display 12.

Figure 5:
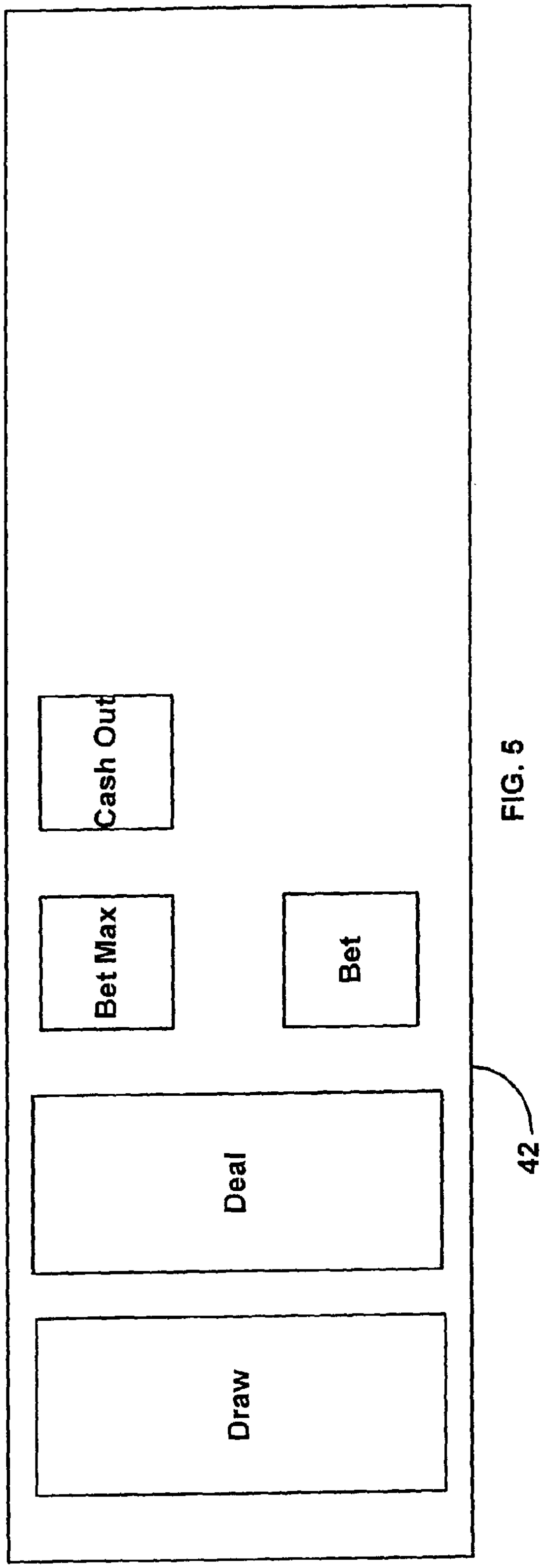

FIG. 5 illustrates touch screen 42 displaying an entirely new set of buttons in response to the player choosing to play a poker game rather than a spinning reels type game.

Figure 6:
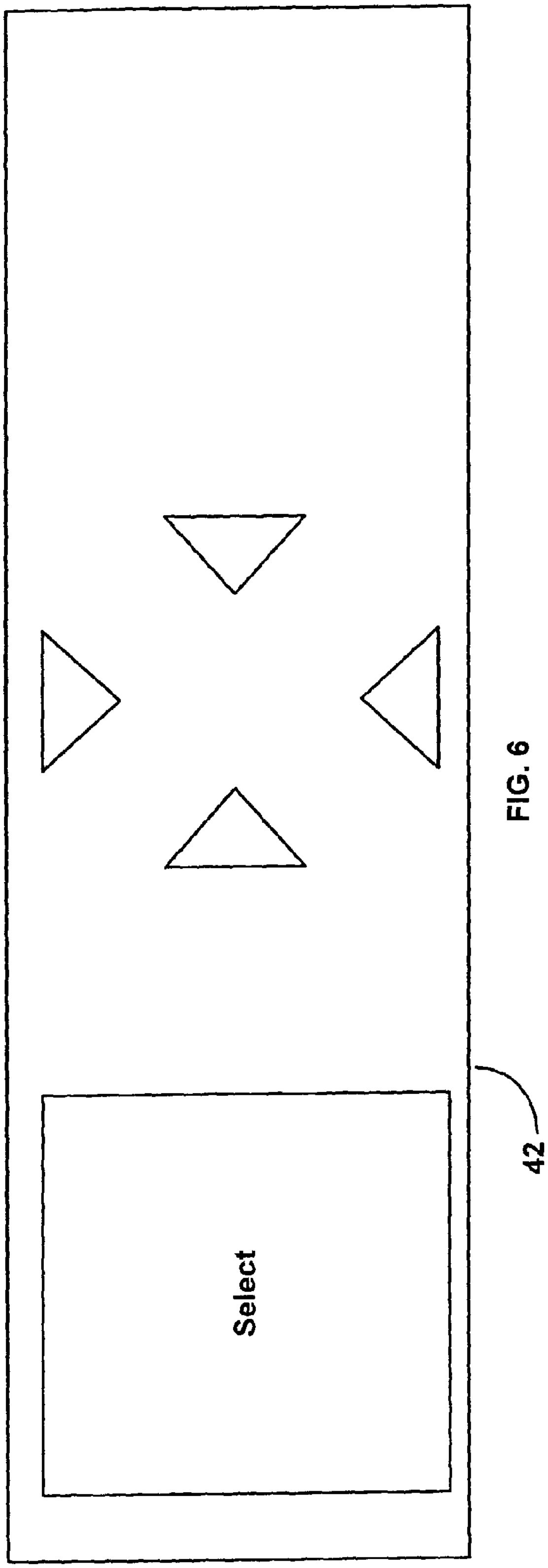

FIG. 6 illustrates touch screen 42 displaying buttons as a result of the player achieving a bonus outcome in the main game and the machine now allowing the player to play a bonus game for an additional award. The bonus game may be a maze type of game, previously described, or any other game.

Touch screen 42 is also useful for simplifying the selection of paylines and bet per line of different games played on the same machine. For example, one game selected by the player may be a basic 3-payline game, while the next player may select to play a 15-payline game. The options provided by touch screen 42 would change for different games to not give inapplicable options to the player.

As seen, anything can be displayed on touch screen 42, resulting in a very flexible and desirable gaming machine for both the players and the casino. By enabling the machine to be easily configurable for different currencies and games by a software change, costs are saved by not having to replace the machine.

Figure 7:
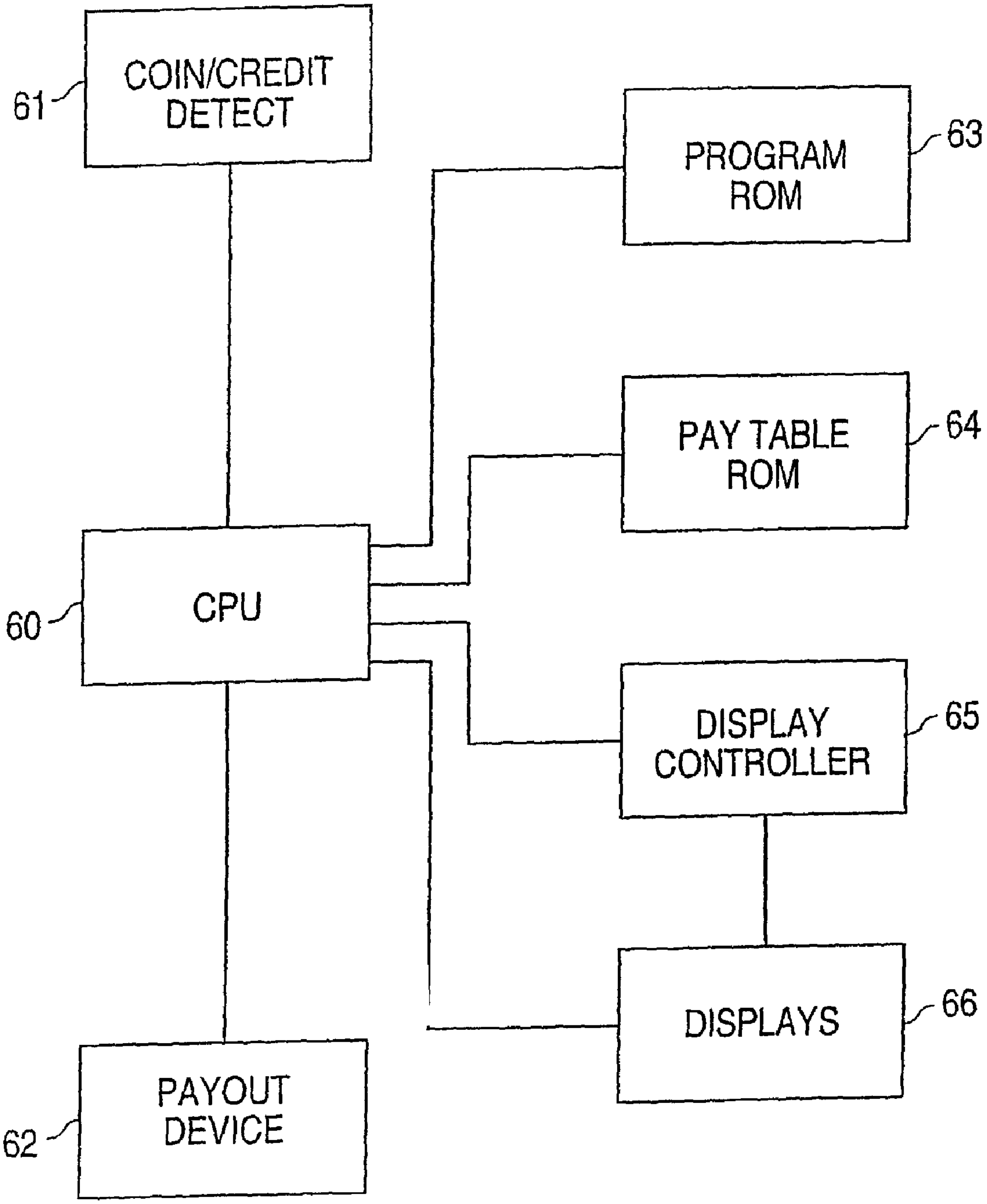
FIG. 7 is a block diagram of various key components in a gaming machine.

FIG. 7 illustrates basic circuit blocks in a suitable gaming device. A control unit (CPU 60) runs a gaming program stored in a program ROM 63. A coin/bill/credit detector 61 enables the CPU 60 to initiate a next game. A pay table ROM 64 detects the outcome of the game and identifies awards to be paid to the player. A payout device 62 pays out an award to the player in the form of coins upon termination of the game or upon the player cashing out. The payout device 62 may instead generate a payout in the form of a coded paper ticket, credits on a smart card or magnetic strip card, or in any other form. A display controller 65 receives commands from the CPU 60 and generates signals for the various displays 66, including touch screen 42. Player commands may be input through the touch screen(s) into the CPU 60.

Figure 8:
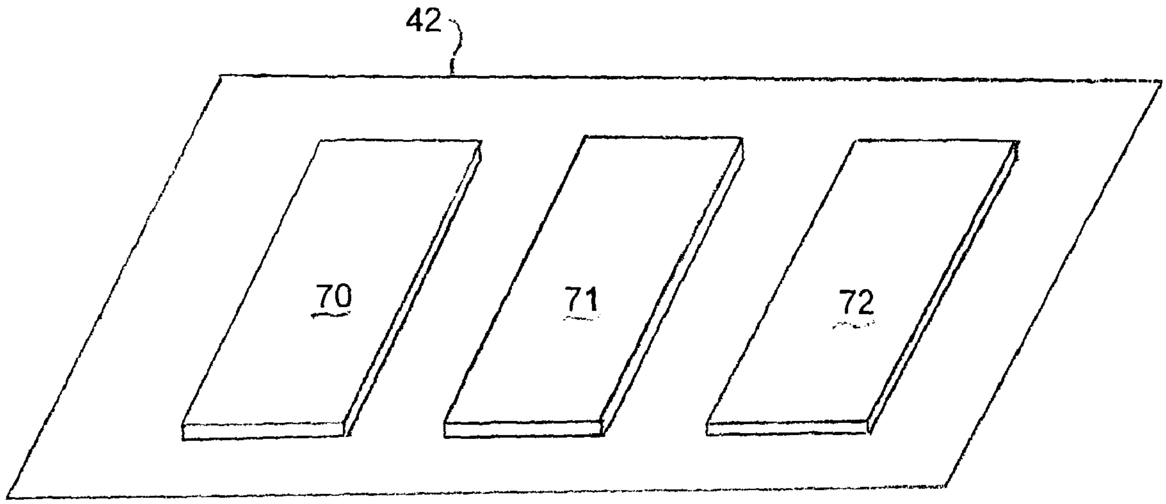
FIG. 8 is a perspective view of a touch screen for player inputs, where portions to be touched by a player are raised.

FIG. 8 is a perspective view of touch screen 42, where certain areas 70, 71, and 72 are raised to give the player the impression of physical buttons. Examples of the raised areas may be for max bet, bet per line, and spin reels. An actual touch screen may have many more raised portions. The identity of each raised area is displayed on the raised area. The displayed identities of the areas and their functions may be changed as described above. The touching of any portion of a raised area performs the designated function.

In one embodiment, each raised area 70-72 is a separate, rigid touch screen that may be pressed downward by the player. The separate touch screens may use an LCD, TFT, or any other type of display. The player receives satisfying tactile feedback by the pressed area hitting a movement limiter or by any other form of tactile feedback. A resilient member behind each raised touch screen area 70-72 urges the area forward. The actuation of the function associated with a raised area 70-72 may be by a conventional detector detecting the capacitive change in the area 70-72 when the player touches the area.

In an alternative embodiment, the raised areas 70-72 are portions of a transparent plastic sheet that overlies a single flat touch screen. Pressing on a raised area of the plastic sheet brings the player's finger close enough to the underlying touch screen to activate the associated function.

In an alternative embodiment, the raised areas 70-72 are raised portions of a flexible touch screen lamination overlying a conventional flat display screen. Touching the raised area activates the function associated with the raised area while giving the player tactile feedback when pushed.

In an alternative embodiment, a mechanical switch is actuated when the raised area 70-72 is pushed down a sufficient amount. In this case, the raised area is transparent and acts like a physical push button with a controllable display under the raised area identifying the function of the button. In such an embodiment, the raised portion or the display does not need to be a touch screen.

The touch screen 42 may have non-raised flat portions that display information and icons, where touching an icon performs a function, and may also have raised button portions, as described above, for particularly important functions, such as for betting and spinning the reels. For example, in FIG. 8, the portion of touch screen 42 surrounding raised areas 70-72 may include icons for displaying a payout table and to perform some other secondary function, and the raised areas 70-72 may be for functions required to play the game.

Other implementations of a 3-dimensional control panel for player control of a game are also envisioned that combine the advantages of a changeable control panel with the characteristics of physical push buttons.

While particular embodiments of the present invention have been shown and described, it will be obvious to those skill in the art that changes and modifications may be made without departing from this invention in its broader aspects and, therefore, the appended claims are to encompass within their scope all changes and modifications that fall within the true spirit and scope of the invention.

What is claimed is:

1. A gaming device comprising:

at least one processor, the at least one processor comprising a processor programmed to carry out a game on a main display;

a main display for displaying the game;

a display screen, separate from the main display, for electronically displaying one or more player input icons for controlling the game, one or more of the icons being electronically changeable pursuant to commands from the at least one processor, wherein the display screen comprises a touch-sensitive layer; and an actuator having displayed within the boundaries of the actuator by the display screen a player input icon to control the game, the actuator being associated with only a single selection option presented to a player, represented by the icon, the actuator having a top surface displaying the icon that is moved in a direction normal to the top surface, by a player's own power, when the actuator is pressed by the player when actuating the actuator, wherein the actuator is resiliently urged upward and provides tactile feedback to a player's finger when pressed by the player, the physical movement of the actuator when pressed by the player providing the only tactile feedback to the player from pressing the actuator, the actuator, when pressed by a player, causing the touch-sensitive layer on the display screen to create control signals to be generated for carrying out a function associated with the player input icon displayed within the boundaries of the actuator.

2. The device of claim 1 wherein the actuator and display screen move together when the actuator is pressed.

3. The device of claim 1 wherein the actuator is a plastic sheet having raised areas over the display screen.

4. The device of claim 1 wherein the actuator comprises raised areas over the display screen.

5. The device of claim 1 wherein downward movement of the actuator causes the generation of the control signals.

6. The device of claim 1 wherein touching the actuator causes the generation of the control signals.

7. The device of claim 1 wherein the actuator comprises a moveable raised portion overlying the display screen.

8. The device of claim 1 wherein the main display is a video screen.

9. The device of claim 1 wherein the main display displays motor-driven reels.

10. The device of claim 1 wherein the at least one processor is programmed for allowing the player to select which icons to display on the display screen.

11. The device of claim 1 wherein the at least one processor is programmed for allowing the player to select the location on the display screen of at least one player input icon.

12. The device of claim 1 wherein the at least one processor is programmed for allowing the player to select a language identifying player input icons displayed on the display screen.

13. The device of claim 1 wherein the at least one processor is programmed to change identities of player input icons displayed on the display screen.

14. The device of claim 1 wherein the at least one processor is programmed to change identities of player input icons displayed on the display screen to only display icons that a player can use for a present game.

15. The device of claim 1 wherein the at least one processor is programmed to highlight certain player input icons displayed on the display screen.

16. The device of claim 1 wherein the at least one processor is programmed to display a message on the display screen to convey information about modifying player input icons displayed on the display screen.

17. The device of claim 1 where the icons comprise a bet icon.

18. The device of claim 1 wherein the display screen comprises a touch screen for displaying one or more icons for touching by a player to perform a function, the one or more icons being other than the at least one displayed player input icon displayed within the boundaries of the actuator.

19. The device of claim 1 wherein the one or more player input icons for controlling the game comprises a plurality of player input icons.

20. A gaming device comprising:

at least one processor, the at least one processor comprising a processor programmed to carry out a game on a main display;

a main display for displaying the game;

a display screen, separate from the main display, for electronically displaying one or more player input icons for controlling the game, one or more of the icons being electronically changeable pursuant to commands from the at least one processor; and an actuator having displayed within the boundaries of the actuator by the display screen a player input icon to control the game, the actuator being associated with only a single selection option presented to a player, represented by the icon, the actuator having a top surface displaying the icon that is moved in a direction normal to the top surface, by a player's own power, when the actuator is pressed by the player when actuating the actuator, wherein the actuator is resiliently urged upward and provides tactile feedback to a player's finger when pressed by the player, the physical movement of the actuator when pressed by the player providing the only tactile feedback to the player from pressing the actuator, wherein the actuator comprises a touch-sensitive layer, the actuator, when pressed by a player, causing the touch-sensitive layer to create control signals to be generated for carrying out a function associated with the player input icon displayed within the boundaries of the actuator.

21. A method carried out by a gaming device comprising:

displaying a game to a player on a main display; and receiving player inputs for controlling the game by a player pressing an actuator having displayed within the boundaries of the actuator, by a controllable display screen separate from the main display, at least one player input icon to control the game, the actuator having a top surface displaying the icon that is moved in a direction normal to the top surface, by the player's own power, when the actuator is pressed by the player when actuating the actuator, wherein the actuator is resiliently urged upward and provides tactile feedback to a player's finger when pressed by the player, the physical movement of the actuator when pressed by the player providing the only tactile feedback to the player from pressing the actuator, the actuator, when pressed by a player, causing control signals to be generated for carrying out a function associated with the at least one player input icon displayed within the boundaries of the actuator, wherein one of the actuator or the display screen comprises a touch sensitive layer for causing the control signals to be generated when a player's finger is sufficiently proximate to the touch sensitive layer.

22. The method of claim 21 wherein the at least one player input icon to control the game comprises a plurality of player input icons.

* * * * *